June 1, 1943.　　F. H. BRUNER ET AL　　2,320,336
ALKYLATION OF HYDROCARBONS
Filed Sept. 15, 1939
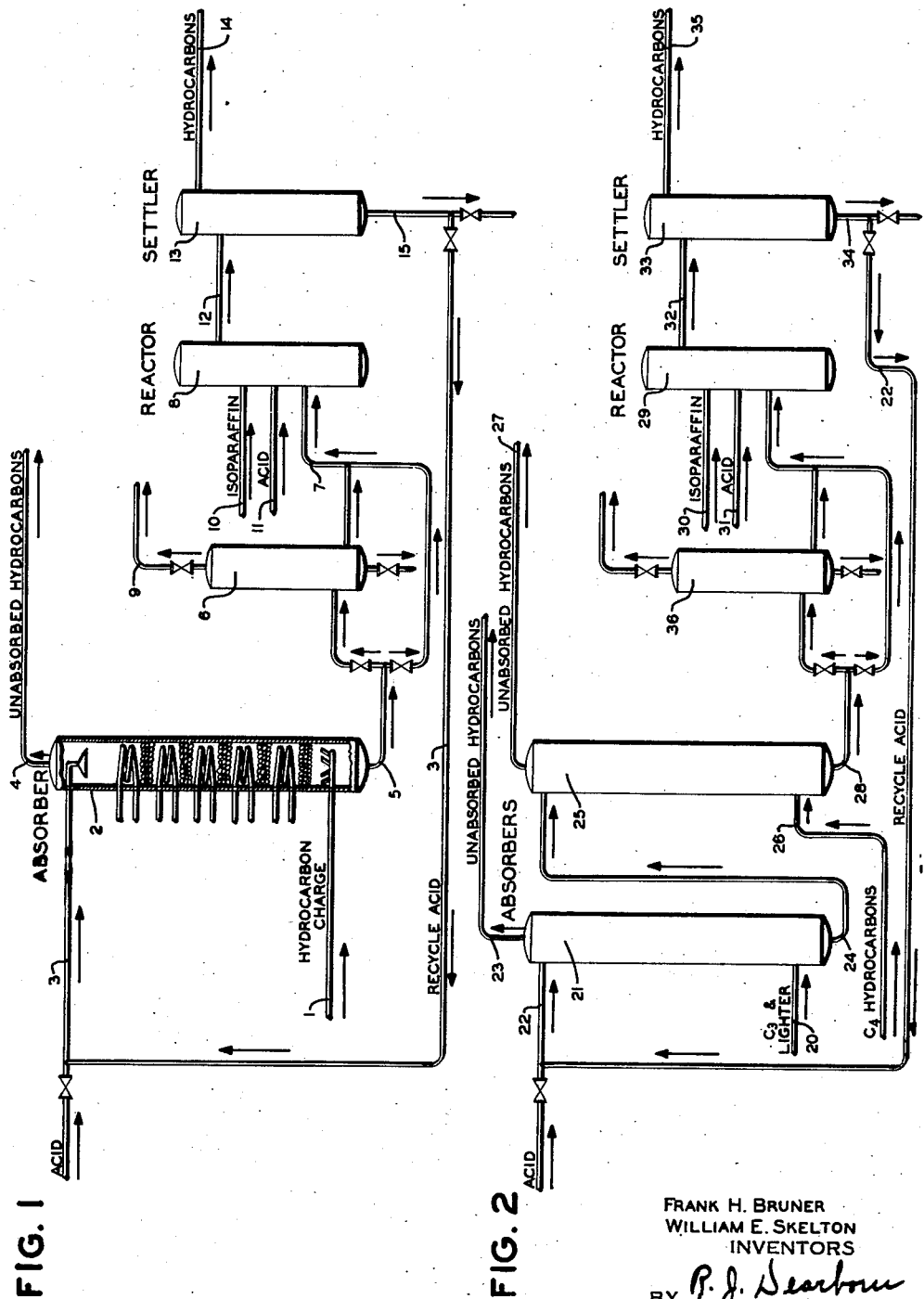
FRANK H. BRUNER
WILLIAM E. SKELTON
INVENTORS
BY
THEIR ATTORNEYS Patented June 1, 1943

2,320,336

UNITED STATES PATENT OFFICE 2,320,336

ALKYLATION OF HYDROCARBONS

Frank H. Bruner and William E. Skelton, Beacon, N. Y., assignors, by mesne assignments, to The Texas Company, New York, N. Y., a corporation of Delaware Application September 15, 1939, Serial No. 295,017

13 Claims. (Cl. 260—683.4)

This invention relates to the alkylation of hydrocarbons involving the reaction of paraffins with olefins in the presence of an alkylation catalyst.

The process has particular reference to the treatment of olefin and iso-paraffin hydrocarbons for the manufacture of high anti-knock gasoline hydrocarbons.

Broadly, the invention contemplates a process of subjecting olefins and iso-paraffin hydrocarbons to reaction in the presence of a liquid alkylation catalyst, such as concentrated sulphuric acid, wherein the olefin hydrocarbons are first absorbed in a separate body of the catalyst under conditions such that alkylation and/or hydropolymerization do not occur, at least not to any substantial extent. Thereafter, the olefin hydrocarbons absorbed in the catalyst are subjected to contact with iso-parafin hydrocarbons under conditions conducive to alkylation.

According to the invention $C_4$ olefins, or a mixture of $C_4$ and lighter olefins, are absorbed in a catalyst such as strong $H_2SO_4$, under conditions such as to prevent objectionable hydropolymerization of $C_4$ olefins and substantial absorption of ethylene in the catalyst. This objectionable hydropolymerization is considered as involving the union of two or more olefin molecules in strong $H_2SO_4$ (90% or more) to form an insoluble saturated hydrocarbon. The hydropolymers are unsatisfactory for alkylation and production of high anti-knock motor fuel.

It is desirable to avoid absorption of ethylene in the acid catalyst because the resulting ethylene sulfate also constitutes unsatisfactory charging stock for alkylation, particularly where the catalyst is concentrated sulphuric acid used under conditions suitable for the alkylation of $C_3$ and $C_4$ olefins.

In carrying out the invention, and where the olefin charge is free from ethylene, the $C_3$ and $C_4$ olefins can be absorbed in the catalyst at low temperatures of the order of 0° F. Where ethylene is present higher absorption temperatures are desirable, at which ethylene is less soluble.

We have found that the absorption operation can be carried out at normal atmospheric temperature, or at a temperature in the range of about 35 to 90° F. without hydropolymerization or substantial ethylene absorption where the absorbing acid contains or is substantially saturated with propylene, either as propyl acid sulfate or dipropyl sulfate, or mixtures thereof.

It has been found that the presence of propylene in the catalyst inhibits substantial hydropolymerization of $C_4$ olefins. Since $C_4$ olefins, such as iso-butylene, are susceptible to substantial hydropolymerization in the presence of an alkylation catalyst, such as concentrated sulphuric acid, particularly during an absorption operation where an excess of iso-paraffin is not present, it is advantageous, from the standpoint of preventing this hydropolymerization and undesirable side reactions, to inject the $C_4$ olefins into a body of the liquid catalyst containing, or saturated with, propylene. The resulting mixture of catalyst and absorbed olefins is then passed to a reaction zone wherein the olefins are brought into contact with iso-paraffin hydrocarbons under conditions such that alkylation occurs with a minimum amount of hydropolymerization, while at the same time avoiding appreciable deterioration of the catalyst.

The liquid catalyst used in the absorption stage advantageously comprises used catalyst being recycled through the process. It is contemplated that the absorption may be effected by either countercurrent or concurrent contact between the recycled catalyst and the feed hydrocarbons.

Also, it is contemplated that it may be advantageous to add some $C_4$ olefin directly to the alkylation reactions to serve as a promoter for breaking down alkyl sulfate and inducing alkylation.

The absorption step is of particular advantage as a means of eliminating normal paraffins, such as propane and butane, from the feed prior to introduction to the alkylation step. Paraffin hydrocarbons will remain unabsorbed in the absorption zone and therefore may be discharged from the system at that point.

Thus, an important object of the invention is to eliminate from the hydrocarbon charge, paraffin hydrocarbons which are unsuited or undesirable for alkylation. This is accomplished by absorption of the olefins in the catalyst under conditions such that objectionable hydropolymerization does not occur.

In order to describe the invention more fully reference will now be made to the figures of the accompany drawing illustrating methods of flow used in practicing the process of the invention.

Referring to Fig. 1, a gaseous hydrocarbon mixture comprising $C_4$ and lighter hydrocarbons, such as derived from the cracking of oil, is conducted from a source not shown through a pipe 1 leading to the bottom of an absorber 2. The absorber may comprise a vertical vessel or tower provided with suitable baffling or packing, and also provided with cooling coils, as indicated, for the purpose of controlling the temperature. The catalyst, for example concentrated sulphuric acid, being recycled from the alkylation step and to which reference will be made later, is conducted through a conduit 3 leading to the top of the absorber 2. The catalyst is distributed by means of a spray or jets over the top of the packing or baffles in the upper part of the absorber.

In the operation of a single countercurrent tower, the catalyst would be pretreated for a short period at the start with propylene to insure having the sulphuric acid sufficiently diluted with propylene to prevent hydropolymerization of $C_4$ olefins. After the initial treatment with propylene, $C_4$ and lighter gases containing propylene would be charged to the bottom of the tower. The $C_4$ olefins would be preferentially absorbed and/or polymerized in the lower portion of the tower and the propylene would be absorbed farther up the tower, continuously diluting the acid coming down the tower so that $C_4$ olefin would always be contacted with acid below alkylation or hydropolymerization strength.

Thus, as the hydrocarbons pass upwardly through the absorber the olefins are absorbed by the catalyst. Saturated hydrocarbons present, such as propane, normal butane and iso-butane, remain unabsorbed and are withdrawn from the top of the absorber through a pipe 4.

These withdrawn unabsorbed hydrocarbons may be subjected to further treatment. For example, the propane may be subjected to dehydrogenation to produce unsaturated hydrocarbons, while the normal butane may be subjected to isomerization. The converted normal butane and the naturally-occurring iso-butane may be used to provide the iso-paraffin hydrocarbon used in the subsequent alkylation step.

The catalyst containing absorbed olefins is withdrawn from the bottom of the absorber 2 through a pipe 5 leading to a vessel 6. From the vessel 6 it is conducted through a pipe 7 to an alkylation reaction vessel 8. The vessel 6 may be by-passed as indicated.

If desired, polymer material contained in the mixture passing to the tank 6 may be separated and withdrawn through a pipe 9 for separate disposition as such or for other treatment such as hydrogenation.

Iso-paraffin hydrocarbon, such as iso-butane, derived from a fractionator or other source, is conducted through a pipe 10 to the vessel 8. The contents of the reaction vessel 8 are subjected to agitation so as to effect efficient mixing and contact between the iso-paraffin hydrocarbon and the olefin hydrocarbons, or catalyst-olefin complex. Additional catalyst, or strong $H_2SO_4$, is introduced through pipe 11. It is, of course, contemplated that the liquids entering the vessel 8 may be introduced in various ways and may be mixed prior to introduction to the vessel.

Conditions are maintained within the reaction vessel 8 so as to effect alkylation for the production of high anti-knock gasoline hydrocarbons. For example, where the catalyst comprises concentrated sulphuric acid the acid strength may vary between 90 to 100%, although 94 to 98% $H_2SO_4$ is preferred. The ratio of acid to total hydrocarbons in the reactor may be around 0.5 to 2.0 parts by volume of acid to one of hydrocarbon. The temperature of the reaction may range around 0° F. to 120° F., but advantageously is about 40 to 90° F. Sufficient pressure is employed to maintain the reacting liquids in the liquid phase.

The ratio of iso-butane to olefins in the charge entering the reactor is at least about 1:1 and preferably about 3:1 to 5:1.

The products of reaction are drawn off through a pipe 12 to a settler 13 wherein the catalyst is settled out from the hydrocarbons. The hydrocarbons from which the catalyst has been removed are withdrawn from the upper portion of the settler through pipe 14, while the separated catalyst is removed from the lower portion through a pipe 15. This withdrawn catalyst is returned, all or in part, through the conduit 3, previously mentioned, to the absorber 2 for reuse.

The hydrocarbons drawn off through pipe 14 may be passed to another alkylation stage or neutralized and subjected to fractionation to remove the desired gasoline hydrocarbons.

It is, of course, contemplated that the alkylation may be carried out in one or more stages. Also, provision may be made for recycling between stages or different stages, as is now well understood in the art.

Referring to Fig. 2, the hydrocarbon fraction, comprising $C_3$ and lighter constituents from a cracking plant or from some other source, substantially free from $C_4$ olefins, is passed through a pipe 20 leading to the bottom of an absorber 21 wherein they are brought into countercurrent contact with the catalyst liquid introduced to the top of the absorber through a pipe 22.

The unabsorbed gases comprising propane and lighter, for example, are drawn from the top of the absorber through pipe 23. The catalyst-olefin mixture withdrawn from the bottom of the absorber 21 through pipe 24 is conducted to the upper portion of an absorber 25. The mixture flows downwardly through this absorber countercurrently to a stream of hydrocarbons comprising $C_4$ hydrocarbons introduced at the bottom of the absorber from a pipe 26.

The unabsorbed hydrocarbons, for example normal and iso-butane, are removed through a pipe 27. The catalyst-olefin mixture accumulating in the bottom of the absorber is drawn off through a pipe 28 and introduced directly to an alkylation reaction vessel 29 wherein it is subjected to intimate contact with iso-paraffins, such as iso-butane, introduced from a pipe 30. If necessary, additional acid may also be introduced from a pipe 31.

As described in connection with Fig. 1, the products of reaction are drawn off through a pipe 32 to a settler 33 wherein separation of the catalyst is effected. The separated catalyst is withdrawn through a pipe 34 and all, or in part, returned to the pipe 22 leading to the absorber 21.

Likewise, the hydrocarbon mixture collecting in the top of the settler 33 is withdrawn through a pipe 35 and disposed of as may be desired as, for example, by neutralization and fractionation, to produce a gasoline hydrocarbon fraction or fractions of desired boiling range.

The iso-paraffin hydrocarbons, such as iso-butane, contained in the alkylate, may be stripped, all or in part, from the alkylated hydrocarbons during this subsequent fractionation and recycled to the alkylation stage.

As described in Fig. 1, the catalyst-olefin mixture may be passed to a vessel 36 directly from the absorber 25 so as to permit removal of any desired amount of polymer material for separate disposition or treatment.

Gas phase absorption is probably preferred, but either or both absorbers may be operated in the liquid phase.

Also, in Fig. 2 it is contemplated that cracked naphtha may be substituted for the $C_4$ fraction and charged to the absorber 25. In such case, the olefins contained in the cracked naphtha would be absorbed in the catalyst-propylene mixture drawn from the absorber 21.

The absorption towers may be operated at a temperature corresponding to about the temperature prevailing in the subsequent alkylation step or, preferably, at about 35 to 90– F.

The beneficial effect of reducing hydropolymerization is indicated by the following experiments in which gaseous iso-butylene was absorbed in 94% $H_2SO_4$ and subsequently alkylated with iso-pentane. In one case the olefin was passed into a short downward flow tower where it was contacted with acid and the mixture passed continuously from the bottom of the tower into agitated iso-pentane. The acid and olefin were introduced to the tower at normal room temperature without pre-cooling and as a consequence the tower became quite warm. In the other case, the acid and olefin were pre-cooled to 0° F. prior to introduction to the tower so that hydropolymerization was inhibited.

The following tabulation affords a comparison of the results obtained:

|  | Without cooling | With cooling |
|---|---|---|
| Charge rate of hydrocarbon gas liters per hour | 18 | 20 |
| Charge of acid cc. per hour | 75 | 83 |
| Acid dosage | 3.0 | 2.7 |
| iso-Pentane olefin ratio | 2.9 | 3.4 |
| Yield of debutanized Naphtha based on olefin percent by weight | 89.0 | 124.5 |
| Yield of 311° end point cut percent by volume of the debutanized naphtha | 18.3 | 39.3 |
| Percent yield based on olefin | 15.3 | 45.8 |
| Bromine No | 6 | 1 |

Although sulphuric acid has been mentioned as an alkylation catalyst and absorption medium, other liquid catalysts may be employed, such as a boron trifluoride-water complex having the approximate formula $BF_3.nH_2O$ where $n$ has a value in the range 1 to 1.5.

Reference is made above and also in the appended claims to the "catalyst and absorbed olefins" in a broad sense since the mixture passing from the absorption tower to the reaction zone may comprise, in addition to alkyl sulfates, substantial amounts of polymers resulting from cross polymerization.

Obviously many modifications and variations of the invention, as hereinbefore set forth, may be made without departing from the spirit and scope thereof, and therefore only such limitations should be imposed as are indicated in the appended claims.

We claim:

1. In the manufacture of high anti-knock gasoline hydrocarbons, the method which comprises absorbing $C_3$ and $C_4$ olefins of a hydrocarbon fraction substantially free from ethylene in strong sulfuric acid at a temperature of around 0° F. whereby hydropolymerization of $C_4$ olefin is substantially avoided, and then contacting an isoparaffin with the absorbed $C_3$ and $C_4$ olefins in the presence of strong sulfuric acid under alkylation conditions whereby isoparaffin is alkylated by the absorbed olefins to produce high anti-knock gasoline hydrocarbons.

2. In the manufacture of high anti-knock gasoline hydrocarbons, the method which comprises absorbing a $C_4$ olefin at a normal atmospheric temperature not in excess of about 90° F. in a liquid acid alkylation catalyst containing previously absorbed propylene, thereby substantially avoiding hydropolymerization of $C_4$ olefin, said liquid acid alkylation catalyst normally causing substantial hydropolymerization of $C_4$ olefin in its initial fresh state free from the absorbed propylene and in the absence of an excess of isoparaffin, and thereafter subjecting the absorbed olefins to contact with an isoparaffin in the presence of liquid acid alkylation catalyst under alkylating conditions whereby isoparaffin is alkylated by the absorbed olefins to produce high anti-knock gasoline hydrocarbons.

3. In a process for the manufacture of high anti-knock gasoline hydrocarbons wherein isoparaffin hydrocarbons and olefins comprising $C_3$ and $C_4$ hydrocarbons are subjected to alkylation in the presence of concentrated sulphuric acid, the steps which comprise absorbing the $C_4$ olefins in the acid at a temperature not in excess of about 90° F., said acid having been previously saturated with $C_3$ olefin, such that substantially no hydropolymerization of $C_4$ olefins occurs, and thereafter subjecting the olefins absorbed in the catalyst to reaction with iso-paraffin hydrocarbons under conditions conducive to alkylation.

4. In a process for the manufacture of high anti-knock gasoline hydrocarbons wherein isoparaffin hydrocarbons and olefins comprising $C_3$ and $C_4$ hydrocarbons are subjected to alkylation in the presence of concentrated sulphuric acid, the steps which comprise absorbing the olefins in a body of the acid at a temperature not in excess of about 90° F. and saturated with $C_3$ olefin, such that substantial hydropolymerization of $C_4$ olefins is avoided, and thereafter subjecting the olefins absorbed in the catalyst liquid to reaction with iso-paraffin hydrocarbons under conditions conducive to alkylation.

5. In a process for the manufacture of high anti-knock gasoline hydrocarbons wherein isoparaffin hydrocarbons and olefins comprising $C_3$ and $C_4$ hydrocarbons are subjected to alkylation in the presence of concentrated sulphuric acid, the steps which comprise absorbing $C_4$ olefins in a body of the acid at a temperature not in excess of about 90° F. containing absorbed propylene, passing the olefins absorbed in the catalyst to a reaction zone and there subjecting the olefins to reaction with iso-paraffin hydrocarbons under conditions conducive to alkylation.

6. In a process for the manufacture of high anti-knock gasoline hydrocarbons wherein isoparaffin hydrocarbons and olefins comprising $C_3$ and $C_4$ hydrocarbons are subjected to alkylation in the presence of a liquid acid alkylation catalyst which normally causes substantial hydropolymerization of $C_4$ olefin in its initial fresh state and in the absence of an excess of isoparaffin, the steps which comprise absorbing a fraction comprising mainly $C_3$ olefins in a body of the catalyst, absorbing a fraction comprising mainly $C_4$ hydrocarbons in the catalyst containing the $C_3$ olefins such that hydropolymerization of $C_4$ olefin is substantially avoided, passing the olefins absorbed in the catalyst to a reaction zone and there subjecting the olefins to reaction with iso-paraffin hydrocarbons under conditions conducive to alkylation.

7. In an alkylation process for the manufacture of high anti-knock gasoline hydrocarbon from a charge comprising $C_3$ and $C_4$ hydrocarbons and containing olefins and paraffins, the steps comprising subjecting the charge in an absorption zone to countercurrent contact with a stream of liquid acid alkylation catalyst whereby both $C_3$ and $C_4$ olefins are absorbed while paraffins are unabsorbed and wherein the entering hydrocarbon charge first contacts liquid catalyst containing absorbed propylene, the said liquid acid alkylation catalyst being such as to normally cause substantial hydropolymerization of $C_4$ olefin in its initial fresh state free from the absorbed propylene and in the absence of an excess of isoparaffin, but wherein the activity of the liquid acid alkylation catalyst is modified by the absorbed propylene whereby $C_4$ olefin is absorbed without substantial hydropolymerization thereof, removing unabsorbed hydrocarbons from the liquid acid alkylation catalyst containing the absorbed olefin, and subjecting the absorbed olefin to contact with an isoparaffin in the presence of liquid acid alkylation catalyst under alkylating conditions whereby isoparaffin is alkylated with the olefins to produce high anti-knock gasoline hydrocarbons.

8. The method according to claim 7 in which the said liquid acid alkylation catalyst comprises strong sulfuric acid.

9. In a process for the manufacture of high anti-knock gasoline hydrocarbons wherein isoparaffin hydrocarbons are alkylated with $C_4$ and $C_3$ olefins in the presence of concentrated sulphuric acid, the steps comprising passing a hydrocarbon fraction comprising $C_3$ olefin and paraffin hydrocarbons through an absorption zone in countercurrent contact with a body of sulfuric acid whereby propylene is absorbed in the acid and paraffins are unabsorbed in the acid, passing said acid and absorbed propylene through a secondary absorption tower in contact with a hydrocarbon fraction comprising $C_4$ olefins and paraffins, whereby $C_4$ olefins are absorbed in the acid and paraffins are unabsorbed in the acid, passing the olefins absorbed in said acid to a reaction zone and there subjecting the olefins to reaction with iso-paraffin hydrocarbons in the presence of concentrated sulphuric acid, under conditions conducive to alkylation.

10. In a process for the manufacture of high anti-knock gasoline hydrocarbons wherein isoparaffin hydrocarbons and olefins comprising $C_3$ and $C_4$ hydrocarbons are subjected to alkylation in the presence of concentrated sulphuric acid, the steps which comprise passing a hydrocarbon charge comprising $C_4$ and lighter olefins and paraffins to an absorption zone, subjecting the charge to contact with the acid containing propylene such that $C_4$ olefins are absorbed from the charge without substantial hydropolymerization, discharging the unabsorbed paraffin hydrocarbons, passing the acid containing absorbed olefins to a reaction zone, and subjecting the absorbed hydrocarbons in the presence of the concentrated sulphuric acid to contact with isoparaffins under conditions conducive to alkylation.

11. In a continuous process for the manufacture of high anti-knock gasoline hydrocarbons wherein isoparaffin hydrocarbons and olefins comprising $C_3$ and $C_4$ hydrocarbons are subjected to alkylation by contacts in a reaction zone with concentrated sulphuric acid, the reaction mixture withdrawn from the reaction zone to separate the used catalyst, and the used catalyst recycled to the reaction for treating further hydrocarbon feed, the steps comprising passing a hydrocarbon fraction comprising normally gaseous $C_3$ and $C_4$ olefins and paraffins to an absorption zone, subjecting the said fraction to contact with an absorption medium comprising recycled acid so as to absorb both $C_3$ and $C_4$ olefins and so that the said fraction is first contacted with acid containing absorbed propylene, discharging the unabsorbed hydrocarbons, withdrawing acid and absorbed olefins from the absorption zone, passing the acid and absorbed hydrocarbons to the reaction zone, subjecting the absorbed hydrocarbons to intimate contact with isoparaffin in the presence of concentrated sulphuric acid under conditions such that there is substantial conversion to alkylated hydrocarbons, passing the reaction mixture to a settling zone, separating used acid from the hydrocarbons in the settling zone, and recycling the separated acid, at least in part, to said absorption zone.

12. In a continuous process for the manufacture of high anti-knock gasoline hydrocarbons wherein isoparaffins and olefins comprising $C_3$ and $C_4$ olefins are subjected to alkylation by contact with concentrated sulphuric acid, the steps comprising passing a $C_3$ and lighter hydrocarbon fraction comprising olefins and paraffins to a primary absorption zone, subjecting said fraction to contact therein with a stream of concentrated sulfuric acid such that olefins are absorbed, while paraffins are unabsorbed, passing the stream of acid and absorbed olefins to a secondary absorption zone, passing a hydrocarbon fraction comprising $C_4$ hydrocarbons to said secondary zone, subjecting the $C_4$ hydrocarbons to contact therein with the acid containing absorbed $C_3$ olefin such that $C_4$ olefins are absorbed, passing the acid containing absorbed $C_3$ and $C_4$ olefins to a reaction zone, subjecting the absorbed olefins to contact with isoparaffin in the presence of concentrated sulphuric acid, such that there is substantial conversion to alkylated hydrocarbons, and withdrawing reacted hydrocarbons from the reaction zone.

13. In a process for the manufacture of high anti-knock gasoline hydrocarbons by alkylation of an isoparaffin with $C_3$ and $C_4$ olefins in the presence of a liquid alkylation catalyst, which catalyst normally causes substantial hydropolymerization of $C_4$ olefins in its initial fresh state and in the absence of an excess of isoparaffin, the steps which comprise contacting a hydrocarbon fraction comprising a $C_4$ olefin with the liquid alkylation catalyst containing absorbed propylene such that the $C_4$ olefin is absorbed under conditions avoiding substantial hydropolymerization, and thereafter subjecting the absorbed olefins to contact with an isoparaffin in the presence of liquid alkylation catalyst under alkylating conditions to produce high anti-knock gasoline hydrocarbons.

FRANK H. BRUNER.
WILLIAM E. SKELTON.